Dec. 18, 1956 L. H. JAMES 2,774,324
SIGNALLING DEVICE
Filed April 1, 1953
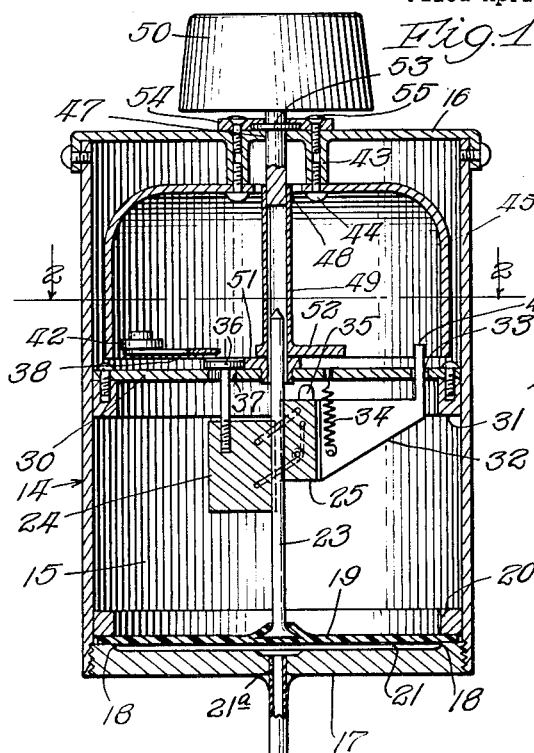
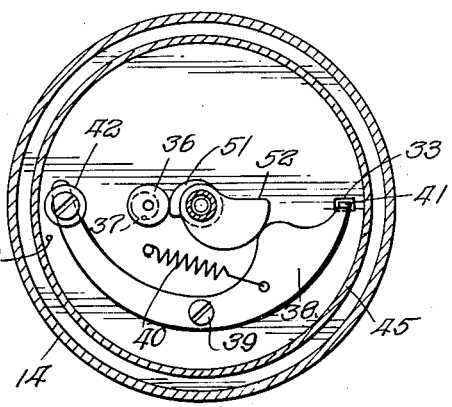
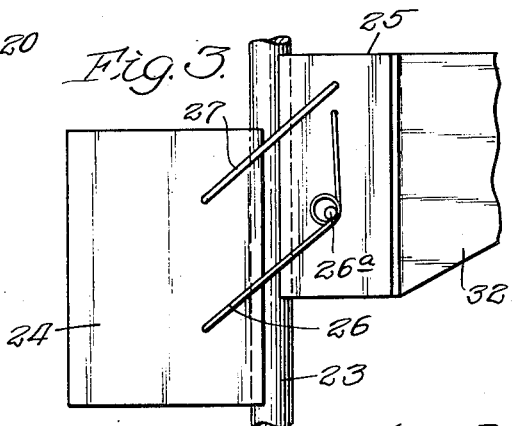
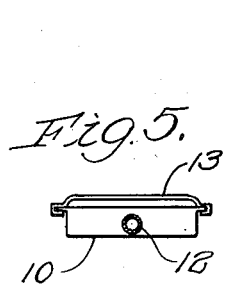
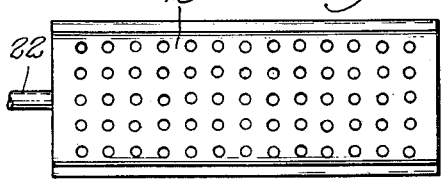
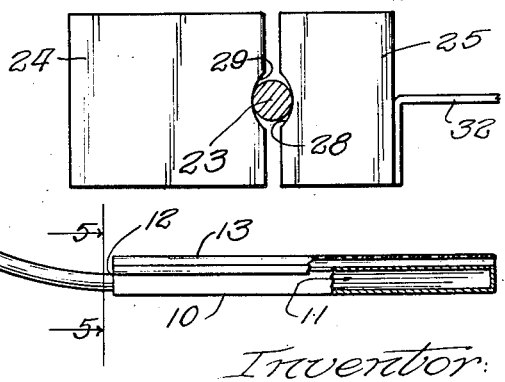
Inventor:
Lawrence H. James,
By Schrader, Merriam,
Hoegren & Brady, Attys.

United States Patent Office 2,774,324
Patented Dec. 18, 1956

2,774,324

SIGNALLING DEVICE

Lawrence H. James, Glen Ellyn, Ill.

Application April 1, 1953, Serial No. 346,138

11 Claims. (Cl. 116—109)

This invention relates to a device which delivers a signal when the boiling liquid level in a heated container falls below a predetermined level by utilizing the combined effect of the lower temperature of the area immediately above the surface of the boiling liquid and the sudden drop in temperature of the hot wetted surface upon evaporation of the last liquid therefrom.

In the boiling of any liquid in a container, substances dissolved or dispersed within the liquid may be injured if the heat to the liquid-containing vessel is continued after evaporation of a predetermined minimal amount of liquid. It is therefore desirable to have an audible signal indicating when the boiling liquid reaches a predetermined level, particularly when one is unable to see the liquid in the container. In this way charring and possible warpage of the container may be prevented.

The present invention provides a simple, economical device by which a signal is delivered whenever a wettable liquid in a container reaches a predetermined level. This signal can readily be utilized to automatically turn off a heat source to the container.

Essentially, the device is to be used with a liquid heating vessel containing a wettable liquid and comprises a temperature responsive means adapted to be immersed in the liquid at a predetermined level, and means associated with the temperature sensitive means to actuate a signalling device upon an impulse resulting from a decrease in temperature of the top surface of the temperature responsive means upon the combined effect of exposure of the temperature responsive means to the area immediately adjacent the top surface of the boiling liquid and the consequent evaporation of the last liquid from the top exposed surface of the temperature responsive means.

An embodiment of a preferred form of this invention is illustrated in the accompanying drawings, in which:

Fig. 1 is an elevational view partially in section of the apparatus;

Fig. 2 is a section view, taken along line 2—2 in Fig. 1;

Fig. 3 is an enlarged elevation view of the gripping elements shown in Fig. 1;

Fig. 4 is a plan view of the components shown in Fig. 3;

Fig. 5 is an end view, taken along line 5—5, of the temperature sensitive element shown in Fig. 1; and Fig. 6 is a plan view of the temperature sensitive element.

The temperature sensitive element 10, here shown as a bulb, has a chamber 11, with connection 12. As best seen in Fig. 5, a perforated baffle 13 is removably crimped to the protruding top surface of the bulb 10 to facilitate cleaning. The bulb has a generally rectangular cross section in the preferred form for ready location in or adjacent the bottom of a liquid containing vessel, but may have other transverse cross-sectional shapes. It is desirable to have a comparatively large top surface area. Ordinarily the bulb is constructed of metal, but any heat conducting material may be used.

As best seen in Fig. 1, the signalling device 14 is composed of a cylindrically-shaped compartment 15 having a top plate 16 and a base plate 17. The inner surface of the base plate is hollowed out providing an annular ring portion 18 about the side walls of the compartment. A pressure sensitive expansible element 19, here shown as a resilient diaphragm, is mounted atop the annular ring portion 18 and secured in place against an annular ring 20 integral with the compartment inner wall. The hollowed out portion of the base plate 17 together with the diaphragm 19 form a chamber 21.

The base plate 17 contains a tapped hole 21a leading into chamber 21. A flexible conduit 22 is connected to this hole, leading to bulb 10 to form a sealed system comprising the chamber 21, the conduit 22 and the bulb 10. The connection 21a of the chamber and connection 12 of the bulb are air-tight. The system is filled with a compressible fluid, such as alcohol. Any liquid may be employed that has a boiling point substantially lower than that of the boiling liquid to be used in the vessel.

A rod 23 is mounted centrally on and extends outwardly from the diaphragm, thus being positioned axially in the cylindrically-shaped compartment 15. Slidingly mounted on rod 23 are gripping elements 24 and 25. As seen in Fig. 3, these elements are pivotally attached to each other by means of wires 26 and 27. The planar opposing faces of gripping elements are provided with grooves 28 and 29, to permit insertion of rod 23 between them when the opposing faces are in close proximity to each other. As seen in Fig. 4, the grooves are sectors of circles having radii somewhat greater than the radius of rod 23. To cause the planar faces of the gripping elements to remain in close proximity, wire 26 is here shown as a coiled tension spring pivotably mounted on pin 26a, gripping element 25 and pivotably secured to gripping elements 24 and 25.

Circular plate 30 extends across the compartment 15, being positioned above the diaphragm 19 by means of support members 31. Plate 30 is tapped at its center to permit passage of rod 23 therethrough and to provide a bearing for reset shaft 49. Trigger arm 32 is attached to and extends radially from gripping element 25 and extends upwardly through a slot 33 in plate 30. Secured to plate 30 and trigger arm 32 is tension spring 34. Bolt 35 is threaded into the upper face of element 25. Bolt 36 is screwed into gripping element 24 and extends through elongated opening 37 in plate 30.

Bell ringer lever 38 is pivotally mounted on pin 39 which is mounted on plate 30. As best seen in Fig. 2, the bell ringer lever 38 tends to pivot counterclockwise about pin 39 under the influence of tension spring 40 except for the holding action of trigger arm 32. At one end, spring 40 is secured to plate 30 and at the other to the operating arm of bell ringer lever 38 at a point between pivot pin 39 and trigger point 41. Bell ringer hammer 42 is equipped with an elongated slot for slide mounting at the end of the power arm of bell ringer lever 38.

Top plate 16 is bolted to signalling device 14 and is equipped with dependent female threaded bosses 43 for receiving bolts 44, thus suspending bell 45. Top plate 16 is perforated to permit emission of sound from bell 45. When trigger arm 32 is disengaged at trigger point 41 from the bell ringer lever 38, the lever rotates under the influence of spring 40 to cause bell ringer hammer 42 to contact bell 45. The rotating motion of lever 38 is stopped when the operating arm contacts stopping pin 46 which is mounted on plate 30. The slide mounting feature of bell ringer hammer 42 causes the hammer to reciprocate, setting up a train of rings of diminishing intensity.

Top plate 16 and bell 45 are equipped with bearing openings 47 and 48 to carry reset shaft 49 with reset knob 50 affixed thereto external to the signalling device 14. Reset shaft 49 is mounted axially in cylindrical signalling device 14 and is cored at the end opposite the knob to permit reception of rod 23. Affixed to the end of the hollow portion of reset shaft 49 are cams 51 and 52. Spring washer 53 is attached to reset shaft 49 at a point immediately external to bearing opening 47 in top plate 16. Spring washer 53 is compressed and secured in place by tapped washer plate 54. Washer plate 54 is bolted to top plate 16 by bolts 55.

In the normal use of this invention, the temperature sensitive element 10 will be positioned at a predetermined level in a heating vessel containing a wettable liquid so as to be immersed therein. The baffle 13 permits the liquid to contact the top surface of element 10 but prevents contact of any solids dispersed in the liquid from contacting that surface. As heat is applied to the vessel to boil the liquid, the compressible fluid within the temperature responsive system expands, causing flexible diaphragm 19 to expand.

As the diaphragm expands, rod 23 moves upwardly a corresponding distance in the signalling device 14. Gripping element 25, which is slidably mounted on rod 23, will accompany the upward motion of the rod until bolt 35 engages plate 30. Further upward movement of rod 23 induces gripping element 24 to pivot about element 25, permitting freer movement of rod 23 into the recessed opening in reset shaft 49. Such expansion continues until the boiling point of the liquid is reached.

Upon exposure of bulb 10 above the top surface of the boiling liquid, the temperature of the compressible fluid drops due to the combined effect of being exposed to the lower temperature area immediately adjacent the top surface of the boiling liquid and the evaporation of the last liquid from the exposed surface of the bulb. This causes compression of the compressible fluid and a collapse of diaphragm 19. Rod 23 then moves downwardly at the same time. It is this downward movement that is utilized to deliver a warning signal in the pictured embodiment. Other means readily apparent to one skilled in the art may be employed in combination with the temperature responsive system to use this collapsing effect to deliver a signal. The downward movement of rod 23 causes both gripping elements 24 and 25, to accompany it. The slight downward movement of element 24 causes trigger arm 32 to become disengaged from the bell ringer lever 38. This disengagement causes the bell 45 to be struck a number of blows by bell ringer hammer 42.

To reset the apparatus, knob 50 is turned, rotating cams 51 and 52 which contact bolt 36 and bell ringer lever 38. The contact against bolt 36 separates the gripping elements 24 and 25 permitting rod 23 to return to its equilibrium position. It further permits element 25 to return to its equilibrium position whereby trigger arm 32 holds bell ringer lever 38 in a cocked position. Undesirable rotation of cams 51 and 52 is prevented by the holding action of springer washer 53 on reset shaft 49.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. In combination with a liquid heating vessel adapted to boil a wettable liquid, a wettable liquid contained therein, temperature responsive means operatively associated with said vessel, and actuating means responsive to said temperature responsive means upon exposure of said temperature responsive means, after immersion in the wettable liquid, to the area immediately adjacent the top surface of boiling wettable liquid and the drop in temperature of the surface of the temperature responsive means upon evaporation of the last liquid therefrom, said actuating means serving to actuate indicator means which serves to indicate when the liquid level of boiling wettable liquid falls below a predetermined level.

2. In combination with a liquid heating vessel adapted to boil a wettable liquid, a wettable liquid contained therein, temperature responsive means operatively associated with said vessel, actuating means responsive to said temperature responsive means upon exposure of said temperature responsive means, after immersion in the wettable liquid, to the area immediately adjacent the top surface of boiling wettable liquid and the drop in temperature of the surface of the temperature responsive means upon evaporation of the last liquid therefrom, and indicator means which is responsive to and actuated by said actuating means, said indicator means serving to indicate when the liquid level of boiling wettable liquid falls below a predetermined level.

3. In combination with a liquid heating vessel adapted to boil a wettable liquid, a wettable liquid contained therein, temperature responsive means operatively associated with said vessel, said temperature responsive means containing a compressible fluid, and actuating means responsive to a decrease in pressure of said compressible fluid resulting from exposure of said temperature responsive means, after immersion in the wettable liquid, to the area immediately adjacent the top surface of boiling wettable liquid and the drop in temperature of the surface of the temperature responsive means upon evaporation of the last liquid therefrom, said actuating means serving to actuate indicator means which serves to indicate when the liquid level of boiling wettable liquid falls below a predetermined level.

4. In combination with a liquid heating vessel adapted to boil a wettable liquid, a wettable liquid contained therein, temperature responsive means operatively associated with said vessel, said temperature responsive means containing a compressible fluid, actuating means responsive to a decrease in pressure of said compressible fluid resulting from exposure of said temperature responsive means, after immersion in the wettable liquid, to the area immediately adjacent the top surface of boiling wettable liquid and the drop in temperature of the surface of the temperature responsive means upon evaporation of the last liquid therefrom, and indicator means which is responsive to and actuated by said actuating means which serves to indicate when the liquid level of boiling wettable liquid falls below a predetermined level.

5. The device as set forth in claim 4 wherein said indicator means comprises audible signal means which produces an audible signal upon being actuated by said actuating means.

6. In combination with a liquid heating vessel adapted to boil a wettable liquid contained therein, a sealed system having chamber means, pressure-sensitive flexible means defining at least a portion of said chamber, a bulb adapted for immersion in the wettable liquid at a predetermined level constructed of heat conducting material, said bulb being filled with compressible fluid, conduit means operatively connecting the bulb to said chamber, said conduit means being free of a movable, actuating portion of said pressure-sensitive means, said pressure-sensitive means being adapted to be actuated by being flexed outwardly when the pressure and temperature of the compressible fluid are increased, said pressure-sensitive means being capable of being flexed inwardly, from said outward position, resulting from a pressure drop of the compressible fluid caused by exposure of the bulb to the area immediately adjacent the top surface of the boiling wettable liquid.

7. The device set forth in claim 6 wherein the pressure-sensitive means is operatively connected to indicator means so that actuation of the pressure-sensitive means, resulting from said pressure drop of said compressible fluid, actuates said indicator means when the liquid level of boiling wettable liquid falls below a predetermined level.

8. The device set forth in claim 6 wherein the pressure-sensitive means is operatively connected to audible signal means which produces an audible signal upon actuation of the pressure-sensitive means, said last-mentioned actuation resulting from said pressure drop of said compressible fluid.

9. A sealed system adapted to be used in combination with a liquid heating vessel, said vessel being capable of being used to boil a wettable liquid comprising: chamber means, pressure-sensitive flexible means defining at least a portion of said chamber, a bulb adapted to be immersed in wettable liquid at a predetermined level constructed of heat conducting material, said bulb being filled with compressible fluid, conduit means operatively connecting the bulb to said chamber, said conduit means being free of a movable, actuating portion of said pressure-sensitive means, said pressure-sensitive means being adapted to be actuated by being flexed outwardly when the pressure and temperature of the compressible fluid are increased, said pressure-sensitive means being capable of being flexed inwardly, from said outward position, resulting from a pressure drop of the compressible fluid caused by exposure of the bulb to the area immediately adjacent the top surface of the boiling wettable liquid.

10. The device set forth in claim 9 wherein the pressure-sensitive means is operatively connected to audible signal means which produces an audible signal upon actuation of the pressure-sensitive means, said last-mentioned actuation resulting from said pressure drop of said compressible fluid.

11. The sealed system set forth in claim 9 wherein the pressure-sensitive means is operatively connected to temperature control signalling means so that a pressure drop of said compressible fluid will cause said pressure-sensitive means to activate said signalling means.

References Cited in the file of this patent
UNITED STATES PATENTS

| | | |
|---|---|---|
| 62,371 | Savage | Feb. 26, 1867 |
| 980,831 | Peterson | Jan. 3, 1911 |
| 992,145 | Banhart | May 16, 1911 |
| 997,987 | Frey | July 18, 1911 |
| 2,546,608 | Melick | Mar. 27, 1951 |
| 2,632,419 | Topping | Mar. 24, 1953 |